Figure 1:
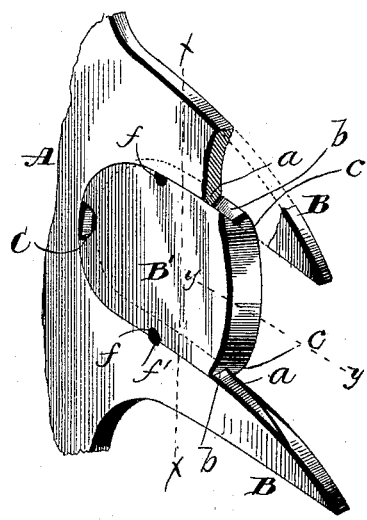

(No Model.)

T. L. SLAUGHTER & E. C. DREW.
DETACHABLE PLANER BIT FOR SAWS.

No. 473,968. Patented May 3, 1892.

Witnesses
C. J. Williamson,
A. L. Hough

Inventors
Triplett L. Slaughter
and Emanuel C. Drew,
by Franklin H. Hough
Atty.

UNITED STATES PATENT OFFICE.

TRIPLETT L. SLAUGHTER AND EMANUEL CHANEY DREW, OF ARCADIA, LOUISIANA.

DETACHABLE PLANER-BIT FOR SAWS.

SPECIFICATION forming part of Letters Patent No. 473,968, dated May 3, 1892.

Application filed April 20, 1891. Serial No. 389,676. (No model.)

*To all whom it may concern:*

Be it known that we, TRIPLETT L. SLAUGHTER and EMANUEL CHANEY DREW, citizens of the United States, residing at Arcadia, in the parish of Bienville and State of Louisiana, have invented certain new and useful Improvements in Detachable Planer-Bits for Saws; and we do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to certain new and useful improvements in saws, particularly circular saws; and it has for its objects, among others, to provide a detachable planer attachment which is not only detachable but reversible, being adapted to be changed and applied in the same place, but reversed, so as to plane upon the opposite side of the saw. Any desired number of these planers may be employed in a single saw. They may be arranged so as to plane upon both sides of the saw at the same time or upon only one side. we form the parallel sides of the throat with V-shaped or analogous-shaped portions, which are adapted to fit correspondingly-shaped grooves in the sides of the planer-tooth, or vice versa. A suitable provision is made for the removal of the planer-tooth when desired, and provisions are also made for the securing of the same in place during the operation of sawing and planing. The corners of the planer tooth or bit are preferable rounded, so as to let the corners cut less than the center portion of the tooth or bit.

Other objects and advantages of the invention will hereinafter appear, and the novel features thereof will be specifically defined by the appended claim.

The novelty in the present instance resides in the peculiarities of construction and the combinations, arrangement, and adaptation of parts, all as more fully hereinafter described, shown in the drawings, and then claimed.

The invention is clearly illustrated in the accompanying drawings, which, with the letters of reference marked thereon, form a part of this specification, in which—

Figure 3:
Figure 2:
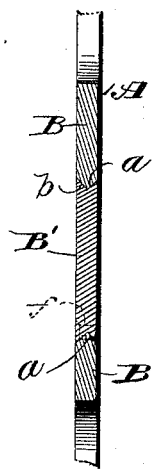

Figure 1 is a perspective view of a portion of a saw, showing the improvement applied. Fig. 2 is a cross-section on the line $xx$ of Fig. 1. Fig. 3 is a section on the line $yy$ of Fig. 1.

Like letters of reference indicate like parts in all the views.

Referring now to the details of the drawings by letter, A designates a portion of a saw, and B the teeth thereof. The adjacent sides of two teeth or the walls of the throat between two teeth are formed substantially V-shaped, as shown at $a$, and this V shape extends for nearly the whole length of the said walls, as shown.

B' is the planer tooth or bit, the opposite sides of which are formed with substantially V-shaped grooves $b$, adapted to fit the ribs on the saw-teeth, the fit being quite snug but yet so as to allow the planer-tooth to be slid into and out of place when desired. The outer or acting face of the planer-tooth is beveled from one side, and the corners are preferably rounded, as shown at $c$, so that they will cut less than the center of the tooth.

At C, either in one end of the planer-tooth or in the throat between the two teeth at the bottom thereof, we provide a small hole for the insertion of a suitable instrument for prying the planer-tooth out when it is desired to change the same. At both sides of the planer-tooth we provide a transverse aperture $f$, diametrically opposite each other and adapted to register with a like aperture $f'$ in the saw-tooth, as seen in Fig. 1, for the insertion of a rivet for the purpose of holding the planer against accidental displacement and permit of its being held in its reversed position.

The application of our invention will be readily understood. The planer-tooth is applied by sliding it into position, with the grooves receiving the ribs, and when in position it is secured by the rivet placed in the hole provided therefor. When it is desired to change the tooth for any purpose—say to reverse it, so as to plane upon the opposite side—the tooth is pried out by the insertion of any suitable instrument in the hole at the bottom of the throat and the tooth then reversed, so that its bevel will extend in the opposite direction to plane upon the other side of the saw.

The invention is applicable to all classes of saws, including lumber and shingle saws.

Modifications in detail may be resorted to without departing from the spirit of the invention or sacrificing any of its advantages. For instance, we should consider it a mere reversal of the construction shown and described if the grooves were made in adjacent walls of the throat and the planer-tooth was provided with the V-shaped ribs.

What is claimed as new is—

The combination, with a saw having V-shaped ribs between two of its teeth and a transverse aperture at one side, of a reversible planer-tooth having V-shaped grooves upon opposite sides, a beveled outer or acting face, a transverse aperture at the inner curved end, and a transverse aperture $f$ at both sides of the tooth between its inner and outer faces, substantially as and for the purpose described.

In testimony whereof we affix our signatures in presence of two witnesses.

TRIPLETT L. SLAUGHTER.
EMANUEL CHANEY DREW.

Witnesses:
L. V. CLAMPITT,
A. V. CLAMPITT.